US012749103B2

(12) United States Patent
Quah

(10) Patent No.: US 12,749,103 B2
(45) Date of Patent: Sep. 29, 2026

(54) MULTI-MODAL COMPONENT SEARCH AND PROCUREMENT SYSTEM

(71) Applicant: Novigens Inc., Dublin, CA (US)

(72) Inventor: Kian Hong Quah, Pleasanton, CA (US)

(73) Assignee: Novigens Inc., Dublin, CA (US)

( * ) Notice: Subject to any disclaimer, the term of this patent is extended or adjusted under 35 U.S.C. 154(b) by 0 days.

(21) Appl. No.: 19/094,103

(22) Filed: Mar. 28, 2025

(65) Prior Publication Data

US 2025/0225559 A1 Jul. 10, 2025

Related U.S. Application Data

(60) Provisional application No. 63/725,229, filed on Nov. 26, 2024.

(51) Int. Cl.

| | |
|---|---|
| ***G06Q 30/00*** | (2023.01) |
| ***G06F 16/2453*** | (2019.01) |
| ***G06Q 30/0601*** | (2023.01) |

(52) U.S. Cl.

CPC ... *G06Q 30/0625* (2013.01); *G06F 16/24534* (2019.01); *G06Q 30/0631* (2013.01)

(58) Field of Classification Search

CPC ... G06Q 30/0601–0645; G06Q 10/087; G06Q 10/0875

USPC .......................................... 705/26.1–27.2, 29

See application file for complete search history.

(56) References Cited

U.S. PATENT DOCUMENTS

| | | | | |
|---|---|---|---|---|
| 7,110,976 | B2 * | 9/2006 | Heimermann | G06Q 40/04 705/37 |
| 10,147,039 | B1 * | 12/2018 | Hayward | G06N 5/025 |
| 10,990,601 | B1 * | 4/2021 | Jarr | G06F 16/248 |
| 11,443,081 | B2 | 9/2022 | Saruyama et al. | |
| 11,762,935 | B2 | 9/2023 | Reed | |
| 12,299,613 | B1 * | 5/2025 | Boyd | G06V 30/274 |
| 2007/0100842 | A1 * | 5/2007 | Wykes | G06Q 30/0603 |
| 2022/0067638 | A1 * | 3/2022 | Wu | G06F 16/22 |
| 2024/0161174 | A1 * | 5/2024 | Godfrey | G06Q 30/0635 |
| 2024/0331011 | A1 * | 10/2024 | Clarke | G06Q 30/0629 |

(Continued)

OTHER PUBLICATIONS

A. Chawla, A. Varshney, M. S. Umar and H. Javed, "ProBot: An Online Aid to Procurement," 2018 International Conference on System Modeling & Advancement in Research Trends (SMART), Moradabad, India, 2018, pp. 268-273, doi: 10.1109/SYSMART.2018.8746954. (Year: 2018).*

(Continued)

*Primary Examiner* — Jeffrey A. Smith
*Assistant Examiner* — Kennedy Gibson-Wynn

(57) ABSTRACT

An intelligent multi-modal component search and procurement system is provided. The system enables users to search for industrial components through multiple input modalities, including keyword queries, BOM (Bill of Materials) file uploads, and natural language interactions. The system dynamically refines search results using a combination of structured filtering, semantic similarity analysis, and machine learning. Key features include a chat interface for natural language processing (NLP), a selection panel for real-time filtering, and a product listing that adapts to user inputs. The invention improves efficiency in industrial procurement by integrating contextual understanding, schema validation, and embedding vector conversions.

9 Claims, 13 Drawing Sheets

(56) References Cited

U.S. PATENT DOCUMENTS

| | | | | |
|---|---|---|---|---|
| 2025/0061396 | A1* | 2/2025 | Sikander | G06Q 10/04 |
| 2025/0307286 | A1* | 10/2025 | Hurst | G06F 16/3338 |

OTHER PUBLICATIONS

Q. Wu, "Supply Chain Risk Assessment and Prevention," 2010 2nd International Conference on E-business and Information System Security, Wuhan, China, 2010, pp. 1-4, doi: 10.1109/EBISS.2010.5473278. (Year: 2010).*

Hurtado, Joan Figuerola. "Harnessing Retrieval-Augmented Generation (RAG) for Uncovering Knowledge Gaps." arXiv preprint arXiv:2312.07796 (2023). (Year: 2023).*

K. Sawarkar, A. Mangal and S. R. Solanki, "Blended RAG: Improving RAG (Retriever-Augmented Generation) Accuracy with Semantic Search and Hybrid Query-Based Retrievers," 2024 IEEE 7th International Conference on MIPR, San Jose, CA, USA, 2024, pp. 155-161 (Year: 2024).*

B. Sai, S. Thanigaivelu, S. N, S. B. C S and R. A, "Integration of Chatbots in the Procurement Stage of a Supply Chain, " 2022 6th International Conference on Computation System and Information Technology for Sustainable Solutions (CSITSS), Bangalore, India, 2022, pp. 1-5. (Year: 2022).*

* cited by examiner

New Parts Submitted from Parts Detail Page (606)

902

Schema Validation with

Category Information Schema 900

901

```
{pneumatic_cylinder_schema.json
  "$schema": "http://json-schema.org/draft-07/schema#",
  "title": "Pneumatic Cylinder Schema",
  "type": "object",
  "properties": {
   "general_information": {
    "type": "object",
    "properties": {
     "manufacturer": { "type": "string" },
     "model_number": { "type": "string" },
     "product_series": { "type": "string" },
     "cylinder_type": { "type": "string" }
    },
    "required": ["manufacturer", "model_number", "product_series", "cylinder_type"]
   },
   "physical_specifications": {
    "type": "object",
    "properties": {
     "bore_size_mm": { "type": "number" },
     "stroke_length_mm": { "type": "number" },
     "rod_diameter_mm": { "type": "number" },
     "cylinder_length_retracted_mm": { "type": "number" },
     "cylinder_length_extended_mm": { "type": "number" },
     "port_size": { "type": "string" },
     "mounting_type": { "type": "string" }
    },
    "required": ["bore_size_mm", "stroke_length_mm", "mounting_type"]
   },
...
}
```

FIG. 9

MULTI-MODAL COMPONENT SEARCH AND PROCUREMENT SYSTEM

CROSS REFERENCES TO RELATED APPLICATIONS

This application claims priority to U.S. Provisional Patent Application No. 63/725,229, filed on Nov. 26, 2024, the contents of which are hereby incorporated by reference in their entireties.

FIELD OF THE INVENTION

The disclosure generally relates to the field of e-commerce procurement systems and, more specifically, to a procurement retrieval system designed for ease of use.

BACKGROUND

Existing e-commerce platforms (e.g. component procurement platforms, such as Digikey, Mouser, Misumi, and SMC), suffer from limited search modalities, reliance on exact keyword matching, and inefficient handling of complex queries. While effective for technically proficient users and professional engineers familiar with specific part numbers and attributes, these systems present significant challenges for general users and procurement personnel who lack domain-specific expertise.

The existing platforms' current deficiencies in processing complex queries manifest in the following aspects: difficulty managing vague, incomplete, or descriptive queries and limited support for multi-modal inputs, such as natural language descriptions or Bill of Materials (BOM) file uploads.

Further, the dynamic personalization such as real-time recommendations tailored to user preferences, past purchasing history, or geographic location and the batch processing and replacement parts are limited. Besides, complex interactions for iteratively refine searches and dynamically adapt to user inputs or preferences are unavailable.

Existing patents, such as EP3690793A1/U.S. Pat. No. 11,443,081B2 and U.S. Pat. No. 11,762,935B2, describe systems focused on static BOM management and enterprise-level procurement workflows. However, these solutions lack critical features such as handling multi-modal input formats (e.g., natural language, descriptive use cases, BOM files), providing conversational interfaces for iterative query refinement and integrating advanced algorithms, such as retrieval-augmented generation (RAG), to minimize hallucinations and improve search accuracy.

This invention addresses these limitations by introducing a user-centric, intelligent component search and procurement system. The system accommodates diverse user groups, ranging from professional engineers to novice users and procurement personnel, and offers a seamless, interactive, and scalable experience across multiple platforms.

SUMMARY

The invention relates to an intelligent, multi-modal component search and procurement system designed to address the challenges of traditional platforms and cater to diverse user needs. The system integrates advanced search methodologies, dynamic user interfaces, and robust algorithms to refine searches and deliver personalized recommendations.

The system supports a variety of query inputs, including part numbers and keywords, natural language descriptions of use cases and BOM file uploads for batch processing.

It dynamically refines user queries through conversational interfaces, leveraging retrieval-augmented generation (RAG) for accurate category identification. Schema validation ensures that all retrieved product data is consistent and reliable, while the system's dynamic interface updates synchronize search results across selection panels, chat interfaces, and product listings.

Key parts of the system include multi-modal input handling, iterative query refinement, personalized recommendations, category identification and schema validation, dynamic interface updates and error handling and scalability.

The multi-modal input handling accepts a wide range of query formats, including keywords, part numbers, descriptive scenarios, and structured BOM files.

The iterative query refinement guides users through clarifying questions using a conversational chat interface. Advanced users can refine attributes directly through a dynamic selection panel.

The personalized recommendations suggest products and sellers based on user preferences, geographic location, and past purchasing history. Also, it ranks products and sellers using metrics like price, availability, lead time, and reviews.

The category identification and schema validation employs vector embeddings for accurate category matching and validates retrieved data against predefined schemas to ensure consistency.

The dynamic interface updates synchronize user input across chat interfaces, selection panels, and product listings for a seamless experience.

The error handling and scalability is achieved with the threshold-based mechanisms which reset irrelevant queries and refine ambiguous ones. Modular design supports large datasets, diverse product categories, and platform scalability.

This system caters to professional engineers, general users, and procurement personnel, addressing their unique challenges and simplifying the component search and procurement process.

The system is adaptable for deployment on multiple platforms, including websites, desktop applications, and mobile devices, ensuring seamless functionality across diverse user interfaces. This flexibility ensures the invention is not restricted to any specific implementation or hardware.

BRIEF DESCRIPTION OF THE DRAWINGS

The drawings and detailed description that follow are intended to be merely illustrative and are not intended to limit the scope of the invention as contemplated by the inventors.

FIG. 9 is a schema for validating product attributes and parameters.

DETAILED DESCRIPTION OF THE EMBODIMENTS

The present invention relates to an intelligent multi-modal component search and procurement system that addresses critical pain points faced by diverse user groups, including professional engineers, procurement personnel, and general users. Unlike existing procurement platforms, the system integrates advanced algorithms, dynamic user interfaces, and personalized recommendation engines to deliver an adaptive, user-centric solution.

The system is designed to handle multi-modal input formats, including part numbers, descriptive text, natural language queries, and BOM files. By employing retrieval-augmented generation (RAG) and vector embeddings, the system maps user queries to product categories with high accuracy, ensuring seamless category identification and attribute refinement.

Dynamic interfaces, such as a conversational chat interface and a selection panel, enable iterative query refinement. These interfaces are synchronized with a central state management system, ensuring consistency across all user interactions. This flexibility allows the system to cater to users with varying levels of technical expertise, from novice users to professional engineers.

The invention addresses inefficiencies in traditional systems, such as the inability to handle incomplete or vague queries, poor BOM processing capabilities, and limited support for dynamic personalization. By incorporating schema validation, the system ensures consistency and reliability across diverse product categories, further enhancing its accuracy and robustness.

The system is designed to provide users with a seamless and efficient way to search for, filter, and procure industrial components through multiple input modalities, including keyword queries, BOM file uploads, and natural language interactions. The system integrates advanced technologies such as natural language processing (NLP), embedding vector conversion, and schema validation to enhance the accuracy and relevance of search results. Below is a detailed description of the system, with reference to the accompanying drawings.

Figure 1:
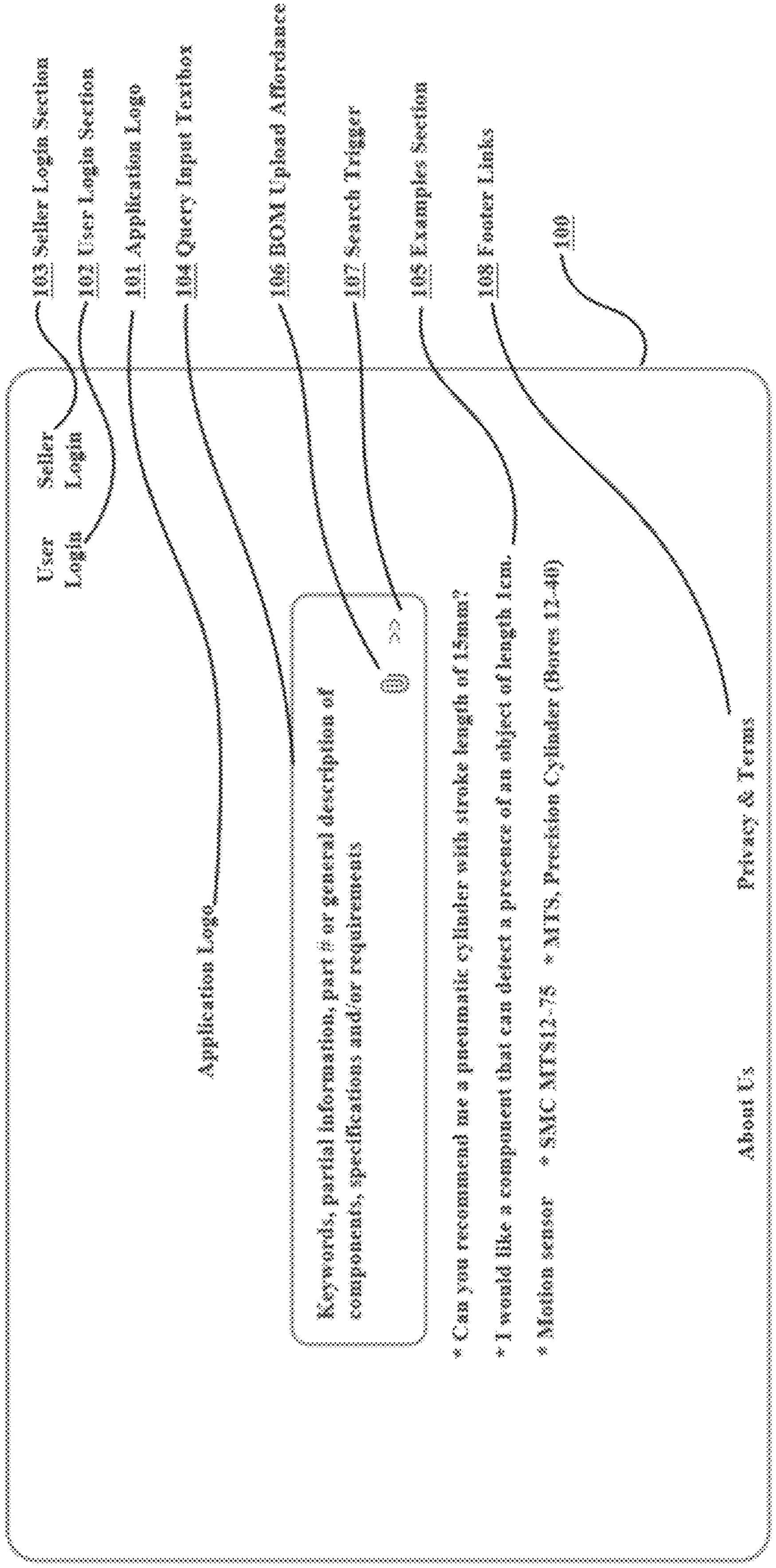
FIG. 1 shows the main page with query input options and BOM upload functionality.

Referring to FIG. 1, a homepage of the system 100 containing multiple functional modules through which users can interact with the system is disclosed.

The system includes an application logo 101 for displaying the brand identity of the application, which is typically located at the top of the page or be placed in any prominent location. The logo application logo 101 is usually a static element. Clicking on it may refresh the page or return to the homepage. Its primary purpose is brand representation and does not involve complex interaction logic.

The system differentiates between two types of entities (users and sellers), resulting in distinct login pages and triggering different functional options accordingly. For example, if it is a user login, there is provided with user login section 102, where users can log into the system through this module. Users enter their username and password and click the login button. The system verifies the user's credentials. If the verification is successful, the user is redirected to their personal homepage or dashboard. If the verification fails, the system displays an error message and prompts the user to re-enter their credentials. After logging in, users can access more functional modules, such as the query input textbox 104 and a BOM upload affordance 106. authentication will be required when adding products to the shopping cart.

While if it is a seller login, there is provide a seller login section 103, where the sellers can log into the system through this module. The sellers enter their username and password and click the login button. The system verifies the seller's credentials. If the verification is successful, the seller is redirected to their management page, where they can manage product listings, view orders, etc. If the verification fails, the system displays an error message and prompts the seller to re-enter their credentials. After logging in, sellers can manage product information, view sales data, etc.

The query input textbox 104 in the system is for entering keywords, part numbers, or general descriptions of components to search. The query input textbox 104 accepts queries in multiple formats, including complete or partial part numbers, keywords, descriptive text or natural language descriptions of desired components, specifications, or requirements. This multi-modal input capability allows users to input queries with varying levels of detail and technical proficiency.

Alternatively, in other implementations, the embodiment may include having the input textbox 104 as part of the search toolbar in a platform or substitution to the common "keyword or part number search" textbox commonly found in most alternative procurement platforms.

Users/sellers enter their query in the input box. Users/sellers can click Search Trigger 107 or press enter to initiate the search. The system searches the database for products or components that match the user's input. The search results are displayed on the product listing page (which will be described fully in FIG. 2). The query input textbox 104 is generally closely related to the search trigger 107. After entering a query, users need to click the search trigger to execute the search.

The examples section 105 displays some common query examples to help users understand how to input queries. The examples section 105 typically shows common search keywords or questions, such as "Recommend a pneumatic cylinder with a stroke length of 15 mm". Novice procurement personnel may utilize basic keywords to retrieve complete product information through the system's simplified search interface, such as "Motion sensor". Alternatively, experienced users may directly input material model numbers or other relevant information. For example, "SMC MTS12-75" may be displayed.

Users can click on these examples, and the system will automatically populate the query input textbox 104 with the example content. Users can directly click the search trigger 107 to execute the search. The examples section 105 is closely related to the query input textbox 104 and the search trigger 107. Users can quickly perform searches using the examples.

The system 100 also includes a BOM upload affordance 106 for uploading a BOM (Bill of Materials) file to search for related components. Users click the BOM upload button, and the system opens a file selection dialog. Users select a local BOM file and upload it. The system 100 parses the BOM file, extracts component information, and searches the database for matching products. This feature supports batch processing of multiple part numbers and associated quantities. Details of BOM file handling will be described in the following sections of the description.

Figure 2:
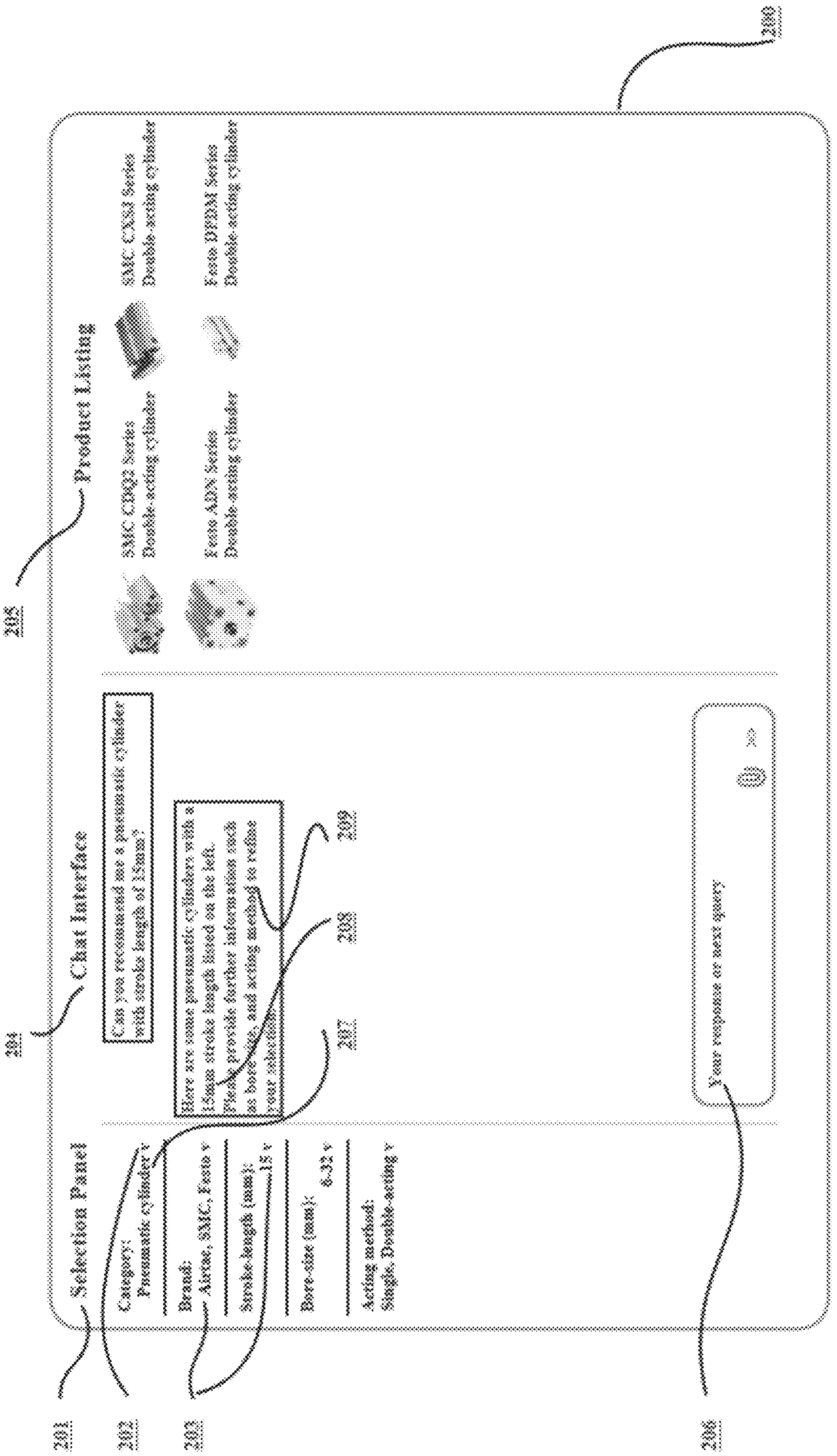
FIG. 2 is a general result page showing initial query results.

The search results are displayed on the product listing page (as shown in FIG. 2). The BOM upload function is similar to the query input textbox 104 and the search trigger 107, serving as an entry point for user searches, but with a different input method.

The search trigger 107 is to initiate a search, by the users, after entering a query. After entering a query in the query input textbox 104, users click the search trigger. The system 100 sends the user's query to the backend server for processing. The backend server searches the database for products or components that match the query. The search results are displayed on the product listing page (as shown in FIG. 2). The search trigger is generally closely related to the query input textbox 104 and the BOM upload function 106. Users need to click this button to execute the search.

Further, there is provide with footer links 108 in the home page such as "About Us" and "Privacy & Terms". Users click on the footer links, and the system navigates to the corresponding pages. The "About Us" page typically displays company information, team introductions, etc. The "Privacy & Terms" page displays the privacy policy and user agreement. footer links are usually unrelated to the page content and are primarily used to provide additional information or legal statements.

The interaction between the modules is as follows.

Users firstly log into the system 100 through the user login section 102. After successful login, they can access more functional modules. Users enter their query in the query input textbox 104 or select an example query from the examples section 105. Users click the search trigger 107, and the system executes the search.

Users can also upload a BOM file through the 106 BOM upload affordance to perform a search. After the search is completed, the system navigates to the results page (as shown in FIG. 2), displaying a list of products that match the criteria.

Users can click on the footer links 108 at any time to view the "About Us" or "Privacy & Terms" information.

Through the interaction of these modules, users can easily log in, enter queries, perform searches, and view relevant information. The system returns corresponding results or pages based on the user's actions.

FIG. 2 schematically shows the search results page returned by the system after the user enters a query or uploads a BOM file on the homepage (FIG. 1). This page contains multiple modules to help users further filter, view, and interact with the system. Below is a detailed analysis of the functions and interaction principles of each module.

The selection panel 201 allows users to further refine search results by selecting different filter criteria. Users can filter by category, brand, stroke length, bore size, etc.

Users click on dropdown menus 202 which allows the user to select or confirm the identified product category (e.g., "Pneumatic Cylinder") or input fields in the selection panel 201 to select or enter filter criteria (e.g., selecting "Pneumatic Cylinder" for category, "SMC" for brand, "15 mm" for stroke length, etc.). The attribute fields 203 enables the user to specify or refine key attributes such as brand (e.g., "Airtac, SMC, Festo"), stroke length (e.g., "15 mm"), bore size (e.g., "6-32 mm") or acting method (e.g., "Single, Double-acting").

Based on the user's selected filter criteria, the system dynamically updates the product listing 205, displaying only products that match the conditions. If the user does not select any filter criteria, the system displays all products that match the initial query conditions.

The selection panel is closely related to the product listing 205. After users select filter criteria, the product listing is updated in real time. The selection panel 201 can also be used in conjunction with the chat interface 204. Users can ask the system for guidance on selecting filter criteria through the chat interface 204.

The chat interface 204 allows users to interact with the system using natural language, asking for product recommendations or further refining query conditions.

Users enter questions or requests in the chat interface 204, such as "Recommend a pneumatic cylinder with a stroke length of 15 mm". The system uses natural language processing (NLP) technologies (OpenAI and/or Kimi for example) to understand the user's intent and recommends products or prompts the user to provide more information (e.g., bore size, acting method, etc.) based on their needs.

The system may automatically update the filter criteria in the selection panel 201 based on the chat content and update the product listing 205. Users can engage in multiple rounds of dialogue with the system through the chat interface to gradually refine their query conditions. For example, users can type new inputs or clarifications into the response field located below the chat interface 204. Clicking the search button or pressing "Enter" triggers the system to update the displayed results accordingly.

The chat interface 204 is closely related to the selection panel 201 and the product listing 205. Questions posed by users through the chat interface directly affect the filter conditions in the selection panel and the content displayed in the product listing.

The chat interface 204 can also help users understand how to use the selection panel for filtering. All user interactions with the selection panel 201 and chat interface 204 are synchronized in the backend state information, ensuring consistency across displayed product listings 205 and subsequent interactions.

The product listing 205 displays products that match the user's query conditions. Users can view detailed information about products through the listing. The system retrieves matching products from the database based on the user's query conditions (from the homepage query input or BOM upload) and the filter criteria in the selection panel 201. The product listing 205 displays basic product information, such as product name, brand, model, stroke length, and bore size, in the form of cards or tables.

Figure 4:
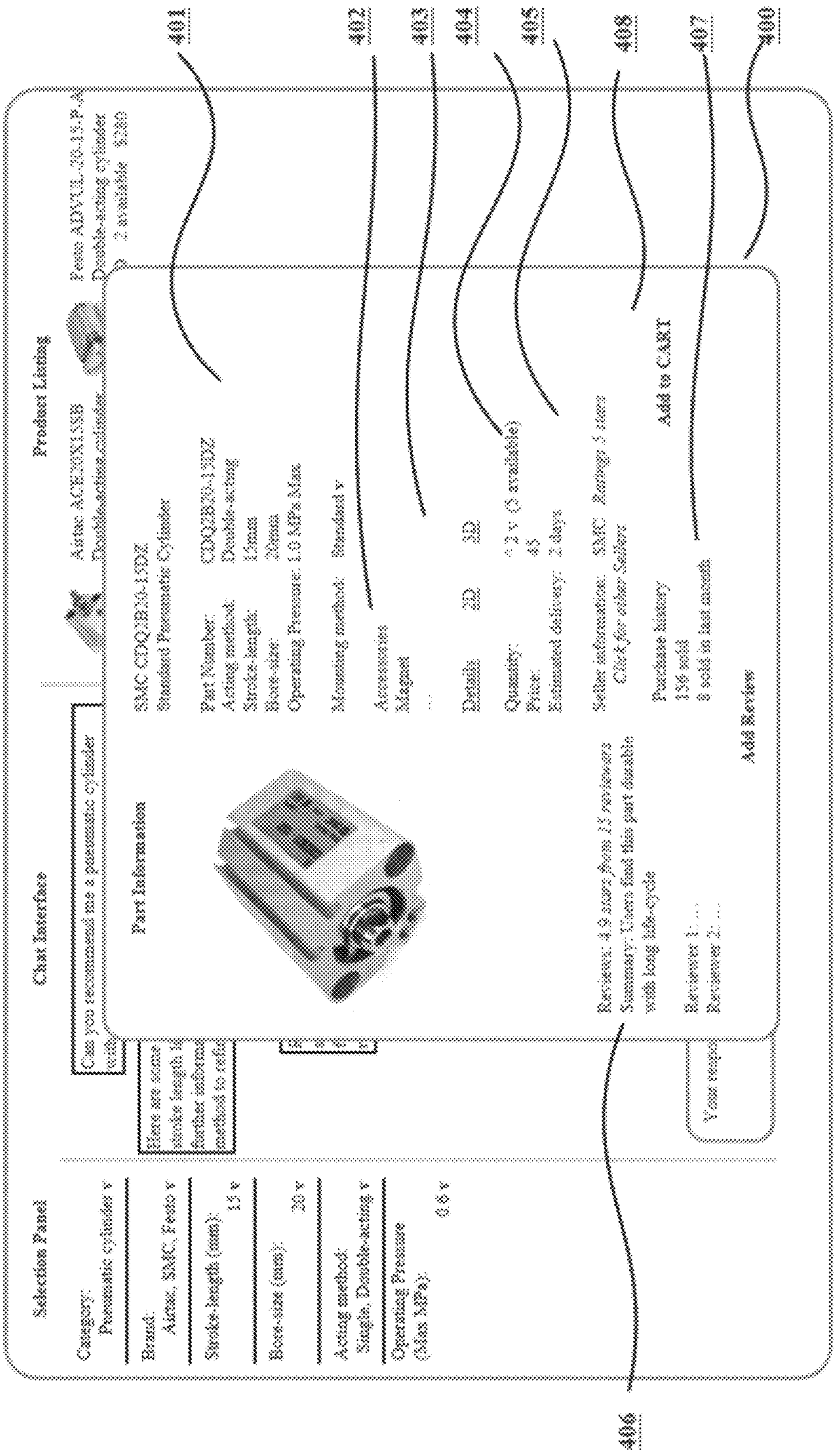
FIG. 4 is a product information window displaying specifications and accessories.

Users can click on a product to view more detailed information (e.g., the product information window shown in FIG. 4).

If users further refine their query conditions through the chat interface 204 or the selection panel 201, the product listing is updated in real time to display only products that match the new conditions.

The product listing 205 is closely related to the selection panel 201 and the chat interface 204. When users adjust query conditions through the selection panel or chat interface, the product listing is dynamically updated. The product listing is the core module for users to view and select products.

The interaction between each module is as below.

After the user enters a query on the main page (FIG. 1), the system navigates to the results page (FIG. 2). The system displays a product listing 203 that matches the user's initial query conditions.

Users can select filter criteria (e.g., brand, stroke length, etc.) through the selection panel 201, and the system updates the product listing 203 in real time. Users can also interact with the system through the chat interface 204, asking for product recommendations or further refining query conditions. Users click on a product in the product listing 205, and the system navigates to the product information page (e.g., FIG. 4) to display detailed information about the product.

The system employs several techniques to address user challenges such as category identification 207 for recognizing vague, incomplete, or misspelled queries (e.g., "peumatic clinder"). The system accurately determines the relevant category (e.g., "Pneumatic Cylinder") using advanced algorithms. The key information extraction 208 identifies provided attributes (e.g., "Stroke Length=15 mm") and maps them to corresponding fields in the selection panel. The iterative query refinement 209 flag missing or ambiguous details, prompting the user for additional input (e.g., "Please provide bore size and acting method to refine your selection").

To ensure an intuitive and streamlined user experience, the system presents a manageable number of attributes at a time, avoiding information overload, dynamically updates the selection panel and product listings based on the user's responses in the chat interface and synchronizes all changes to ensure consistency across all interface components.

The layout in FIG. 2 represents only one possible configuration. Alternative designs may include positioning the selection panel at the top for horizontal filtering, displaying the Chat Interface as a pop-up window or integrating additional panels or interaction elements as overlays.

Figure 3:
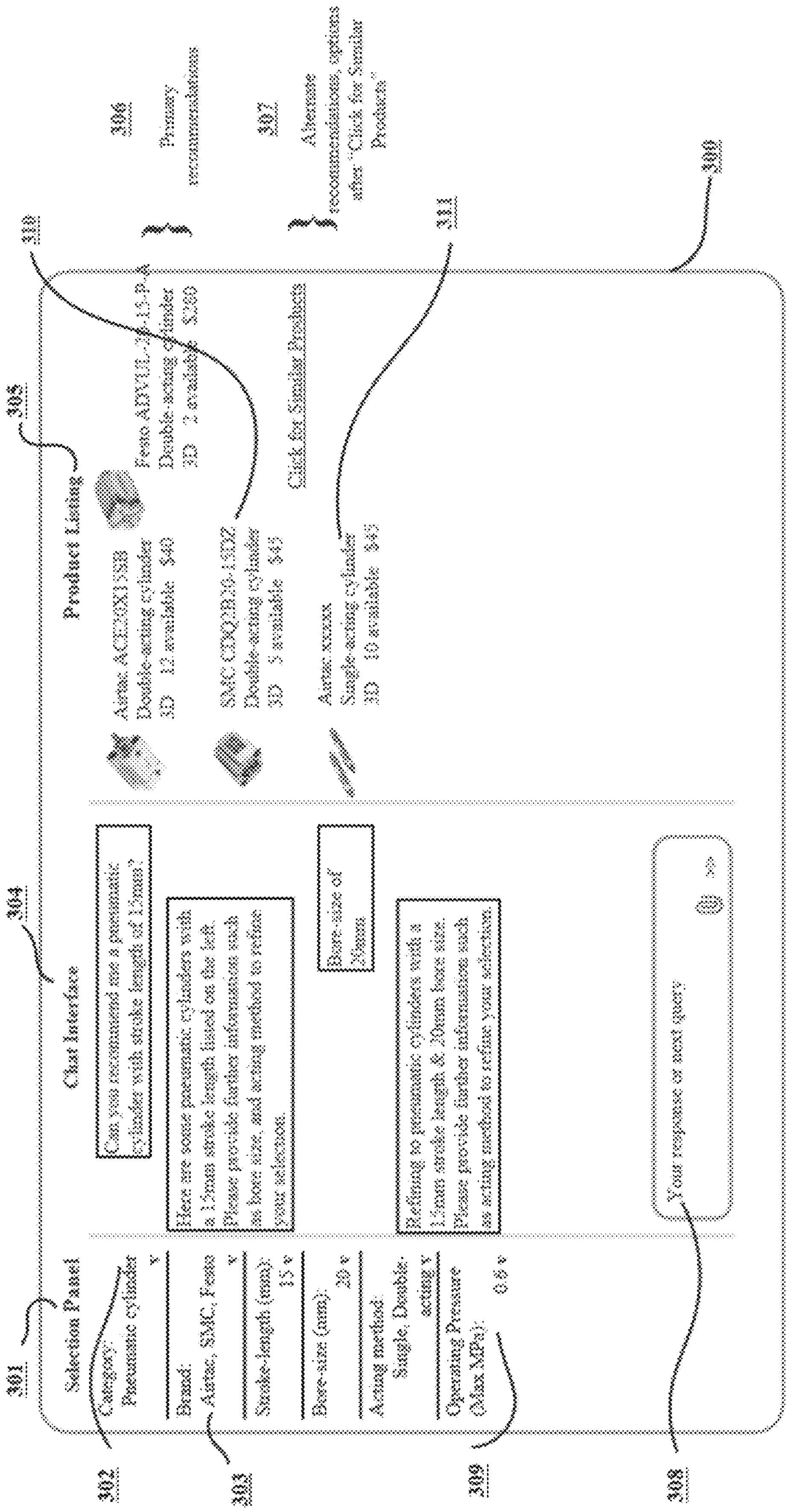
FIG. 3 is a refined result page after user-provided input refinement.

FIG. 3 schematically shows the refined page after the search results page returned by the system and the user further refines the query conditions on the results page (FIG. 2). This page contains multiple modules to help users further filter, view, and interact with the system. This interface (300) dynamically adapts to additional input provided by the user, presenting a more targeted list of products and product series. In this example, the user has specified an additional attribute, such as bore size. While bore size is used as an example, the system applies the same logic to refine searches based on any attribute relevant to different product categories.

The selection panel 301 allows users to further refine search results by selecting additional filter criteria. Compared to the selection panel in FIG. 2, the one in FIG. 3 includes more filter options, such as operating pressure.

Users click on dropdown menus or input fields in the selection panel to select or enter additional filter criteria (e.g., selecting "0.6 MPa" for operating pressure). Based on the user's selected filter criteria, the system dynamically updates the product listing 305, displaying only products that match the new conditions.

If the user does not select any new filter criteria, the system displays all products that match the initial query conditions. The selection panel 301 interacts with the backend database through the frontend interface. The filter criteria selected by the user are sent to the backend, which retrieves matching products from the database based on these conditions.

The primary recommendations 306 display the most relevant or popular products recommended by the system based on the user's query conditions. The system retrieves the most matching products from the database based on the user's query and filter conditions and displays them as primary recommendations 306. The primary recommendations 306 are part of the product listing 305 and are usually located at the top of the listing. Primary recommendations 306 are usually located at the top of the product listing to highlight them.

The system uses algorithms (e.g., based on user history, product ratings, sales volume, etc.) to determine the primary recommendations and prioritizes displaying them to the user. Users can quickly find products that best meet their needs through the primary recommendations, reducing filtering time.

The alternate recommendations 307 display other products similar to the primary recommendations, providing users with more options.

The system retrieves similar products from the database based on the characteristics of the primary recommendations 307 (e.g., category, brand, specifications, etc.) and displays them as alternate recommendations. The alternate recommendations 307 are usually located below the primary recommendations, and users can click "View more similar products" to see additional alternatives.

Users can find more products that meet their needs through the alternate recommendations 307, increasing their options. The alternate recommendations 307 are part of the product listing 305 and are usually located below the primary recommendations.

The interaction flow between each module in the FIG. 3 and the FIG. 4 is as follows.

After the user selects additional filter conditions or further refines query conditions through the chat interface 304 on the results page (FIG. 2), the system navigates to the refined results page (FIG. 3).

The system displays a product listing 305 that matches the user's refined query conditions and highlights the most relevant or popular products as primary recommendations 306. Users can view other products similar to the primary recommendations 306 through the alternate recommendations 307.

Users can further adjust query conditions through the selection panel 301 or chat interface 304, and the system updates the product listing 305 in real time. Users click on a product in the product listing 305, and the system navigates to the product information page (e.g., FIG. 4) to display detailed information about the product.

The interface in FIG. 3 is optimized for ease of use. Attributes are revealed progressively, guiding the user step-by-step toward a refined search without overwhelming them with unnecessary details. Advanced users, such as professional engineers, can utilize the expanded Selection Panel for quick, targeted refinements. The Chat Interface provides iterative guidance, making the system accessible for users with limited technical expertise. The selection panel and chat interface are used to further refine query conditions, the product listing displays the results, and the primary and alternate recommendations help users quickly find products that best meet their needs.

FIG. 4 is the detailed product information page displayed by the system after the user clicks on a product in the product listing (e.g., FIG. 2 or FIG. 3). This interface 400 provides an intuitive and information-rich view of the selected product, ensuring the user has access to all relevant details to make informed decisions. While the layout in FIG. 4 represents one possible organization, alternative designs such as reorganizing sections, integrating pop-ups, or utilizing tab-based navigation can also be adopted based on UX design considerations.

The part information 400 displays detailed information about the selected product, including brand, model, stroke length, bore size, operating pressure, etc. Users can quickly understand the detailed parameters and specifications of the product through the part information module, aiding their purchasing decisions.

The product details section 401 within the part information 400 displays essential attributes and specifications of the selected product. The information includes product name and series (e.g., "SMC CDQ2B20-15DZ Double-acting Cylinder"), technical specifications such as dimensions, operating pressure, material, and compatibility. This section ensures that users can quickly review the key details without needing to navigate away.

The accessory selection 402 provides users with a list of compatible accessories for the product, streamlining the procurement process by allowing users to add necessary accessories directly.

The design files section 403 offers downloadable resources such as 2D drawings (for integration into engineering workflows), 3D models (for CAD applications, data sheets and manuals (supporting technical and procurement needs).

The part information 400 is the core of the product information window, and other modules (e.g., user reviews and similar product listings) revolve around it.

Users can learn about the product's basic information through the part information module and then make more comprehensive judgments by combining user reviews 406 and similar product listings.

The reviews 406 displays reviews from other users about the product, helping users understand the actual usage experience of the product. The reviews typically display user reviews 406 in the form of star ratings and text comments. The user reviews 406 displays past user reviews for the product along with a summary generated by a Large Language Model (LLM). This summary consolidates user feedback into a concise format, offering insights into product reliability and usage scenarios. Users can read reviews 406 from other users to learn about the product's strengths, weaknesses, and usage experiences. Users can also add their own reviews (with the Add review function) in this module (if logged in). Users understand the actual usage of the product through the reviews module, helping them determine whether the product meets their needs. The reviews 406 can also help users decide whether to explore similar products.

The seller recommendations 405 highlights the primary recommended seller for the product, presenting their pricing and availability details. It includes an affordance to explore alternative sellers, enabling users to compare options based on price, lead time, or other factors.

The purchase statistics section 407 provides a visual summary of the product's purchase history, offering insights into past transaction trends to help the user assess its popularity or reliability.

The add to cart 408 is positioned prominently to allow users to quickly add the selected product to their shopping cart for checkout.

The product listing displays other products similar to the selected product, providing users with more options. Based on the characteristics of the selected product (e.g., category, brand, specifications, etc.), the system retrieves similar products from the database and displays them in the product listing 403. Users can click on a similar product to view its detailed information. Users can find more products similar to the selected one through the product listing, increasing their options.

The product listing can also be used in conjunction with the reviews 406. Users can learn about the actual performance of similar products through user reviews.

Interaction flow between each module in FIG. 4 is as follows.

After the user clicks on a product in the product listing (e.g., FIG. 2 or FIG. 3), the system navigates to the product information window (FIG. 4). The system loads the detailed information of the selected product and displays it in the part information 400. Users can view reviews from other users about the product in the reviews 406. Users can view other products similar to the selected one in the product listing.

The comprehensive product information ensures that all essential details, from technical specifications to seller data, are available in a single interface. Which reduces the need for users to switch between multiple screens or resources. The streamlined accessory selection allows users to select and add accessories tailored to the product, simplifying the procurement process. The integrated design resources facilitate technical workflows by providing quick access to 2D/3D files and datasheets. The user-centric recommendations highlight the most relevant seller by default while offering links to explore alternatives. Further, the enhanced decision-making consolidates user reviews and purchase statistics to provide additional context and help users make informed decisions.

Figure 5:
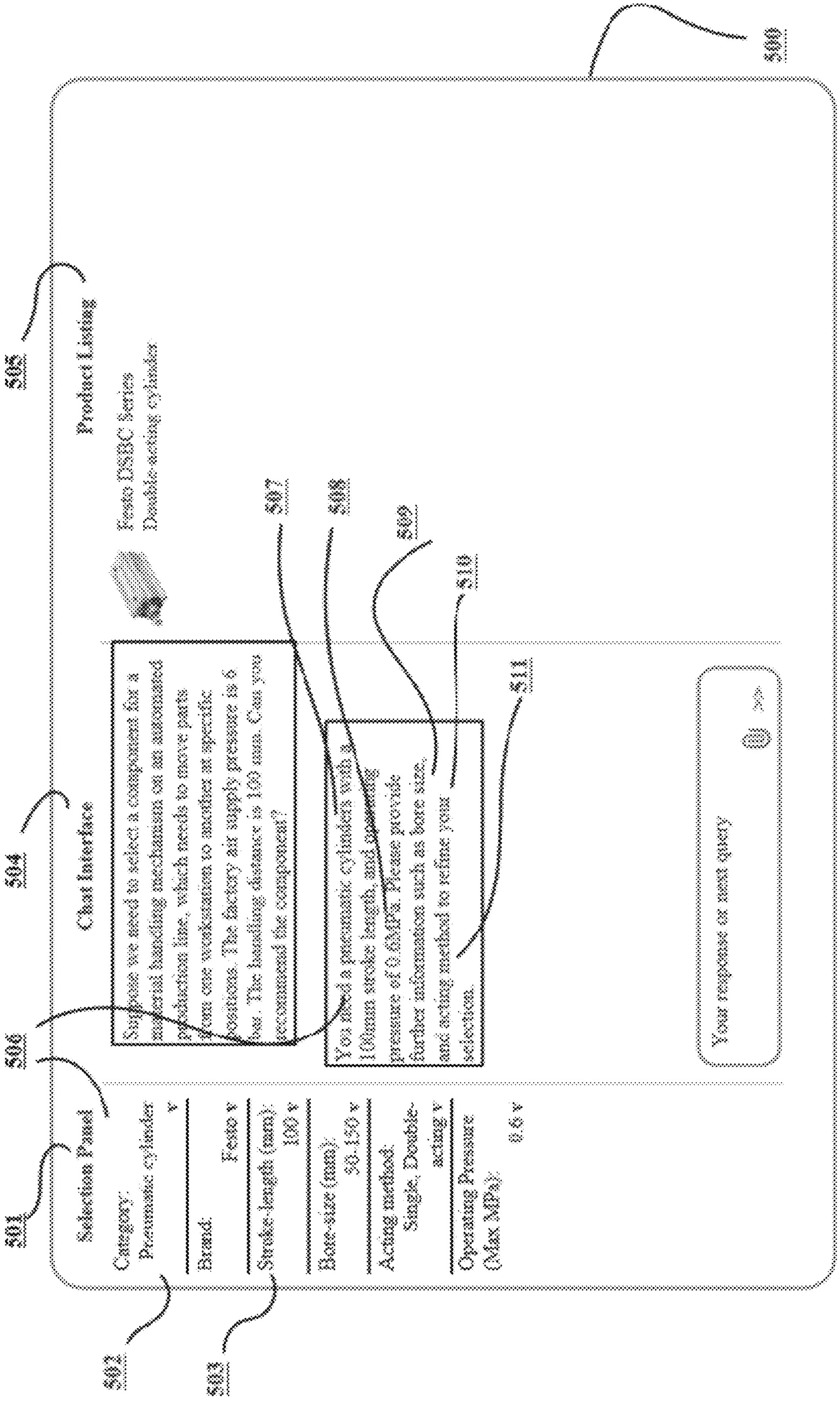
FIG. 5 is a result page for general context searches using descriptive queries.

FIG. 5 schematically shows the search results page returned by the system after the user performs a search within a specific context (e.g., a material handling mechanism in an automated production line) which is specifically designed to handle use cases where the user does not have explicit knowledge of the product category or its technical attributes. This page contains multiple modules to help users filter, view, and interact with the system based on contextual needs. This interface 500 leverages advanced natural language processing and dynamic query refinement capabilities to recommend appropriate products based on descriptive or use-case-based queries.

The selection panel 501 positioned on the left side dynamically populates relevant product categories and attributes extracted from the user query, which allows for users to further refine search results by selecting different filter criteria. Users can filter by category 502, and attribute fields 503 such as stroke length (e.g., "100 mm"), bore size (e.g., "50-150 mm"), acting method (e.g., "Single, Double-acting") and operating pressure (e.g., "0.6 MPa"). These fields are iteratively refined as more user input is provided.

Users click on dropdown menus or input fields in the selection panel to select or enter filter criteria (e.g., selecting "Pneumatic Cylinder" for category, "100 mm" for stroke length, etc.).

Based on the user's selected filter criteria, the system dynamically updates the product listing 505, displaying only products that match the conditions. If the user does not select any filter criteria, the system displays all products that match the initial query conditions.

The selection panel 501 interacts with the backend database through the frontend interface. The filter criteria selected by the user are sent to the backend, which retrieves matching products from the database based on these conditions. Users can further narrow down the search range to find products that better meet their contextual needs.

The selection panel can also be used in conjunction with the chat interface 504. Users can ask the system for guidance on selecting filter criteria through the chat interface 504.

The chat interface 504 allows users to interact with the system using natural language to ask for product recommendations or further refine query conditions. The chat interface 504 allows users to input natural language queries (e.g., "Suppose we need to select a component for a material handling mechanism on an automated production line, which needs to move parts from one workstation to another at specific positions. The factory air supply pressure is 6 bar. The handling distance is 100 mm. Can you recommend the component?"). The system responds by interpreting the query and generating structured recommendations (e.g., "You need a pneumatic cylinder with a 100 mm stroke length and an operating pressure of 0.6 MPa. Please provide further information such as bore size and acting method to refine your selection.").

The system uses natural language processing (NLP) technology to understand the user's intent and recommends products or prompts the user to provide more information (e.g., bore size, acting method, etc.) based on their needs. The chat interface 504 uses NLP technology to parse the user's natural language input, convert it into structured query conditions, and send it to the backend for processing. Users can interact with the system using natural language to quickly obtain product recommendations that meet their contextual needs.

With the category identification 507, the system identifies the appropriate product category even if the user's query lacks precise terminology (e.g. descriptive input " . . . select a component for a material handling mechanism on an automated production line . . . " or the system-identified category: "Pneumatic Cylinder."). This capability relies on advanced natural language processing and vector embedding techniques.

The attribute structuring 508 extracts key parameters (e.g., stroke length, operating pressure) from the user's descriptive input and maps them to predefined fields within the identified category.

The iterative refinement 509 is achieved if the initial input lacks certain key attributes (e.g., "bore size" or "acting method"), the system prompts the user for additional details to narrow down the search results.

The structured recommendations 510 converts natural language queries into actionable structured objects and suggestions by interpreting user requirements and mapping them to product attributes.

The guidance for general users 511 is particularly beneficial for general users who may not be familiar with technical specifications, product categories, or product attributes. By interpreting their use-case-based queries, the system ensures an accurate and efficient search experience.

While FIG. 5 illustrates one possible configuration of the general context search interface, the Selection Panel fields may be expanded or reorganized to emphasize specific attributes relevant to the query. Alternate designs may integrate product listings within the chat interface or utilize pop-up modals for additional attributes.

Figure 6:
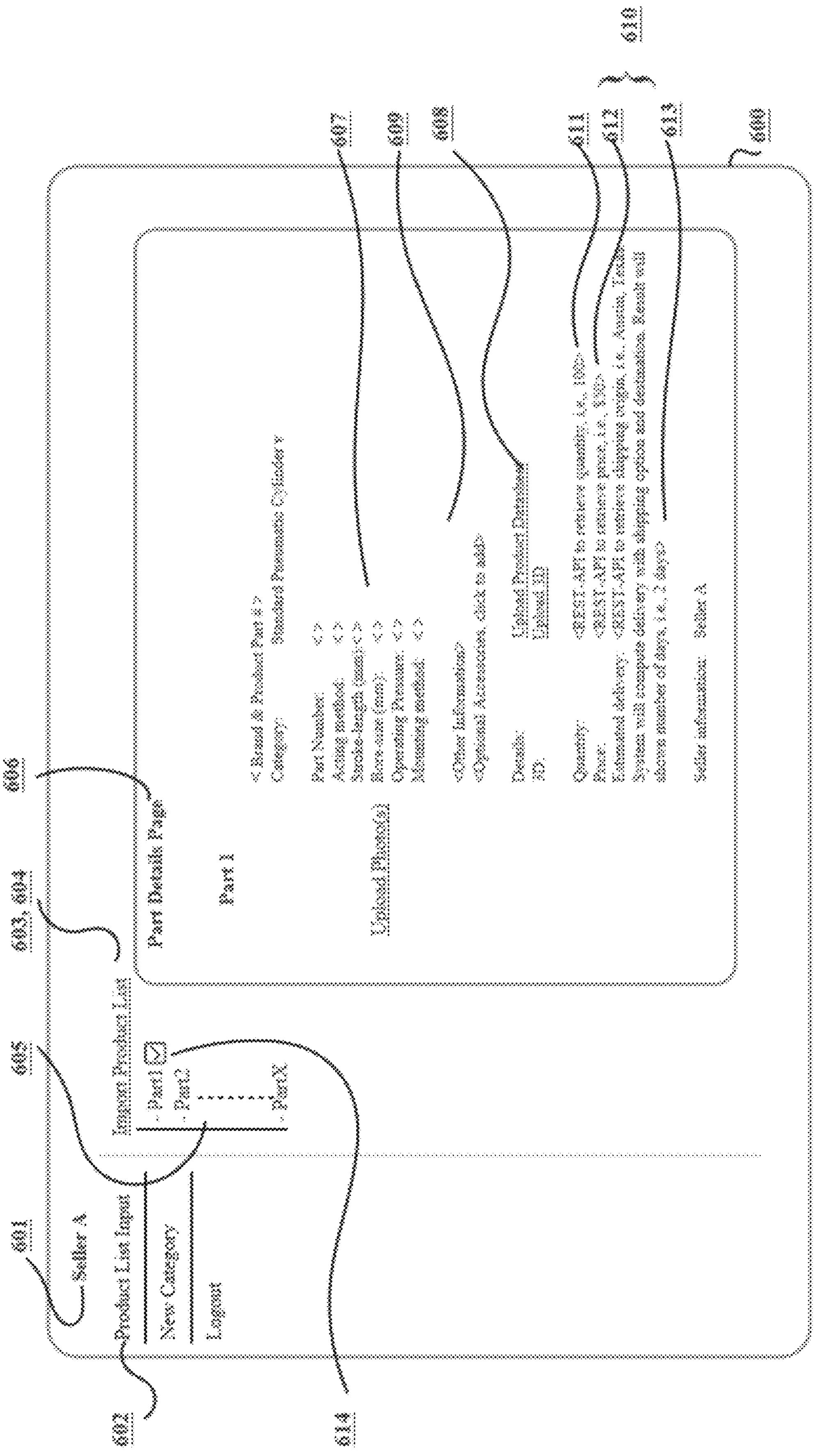
FIG. 6 is a seller interface for product management and SKU updates.

FIG. 6 is a seller page and product indexing where sellers manage their product listings and product information, which enables sellers to manage their product data and validate information within the system. This interface 600 streamlines the process of product information upload, refinement, and validation, ensuring consistency and completeness of indexed data.

The seller identification panel 601 displays the logged-in seller's information, such as their name (e.g., "Seller A" or multiple names under a unified account), and provides navigation options such as product list input for accessing to upload or modify product information, new category option to propose a new product category and logout for session termination.

The seller identification panel 601 displays sellers' product list, allowing the seller to manage their product information on this page. After the seller logs in, the system loads the sellers' (e.g. Seller A) page and displays their product list. The seller can view, edit, or delete their product information on this page. Sellers can conveniently manage their product list through this page, ensuring the accuracy and timely updates of product information.

The product list input 602 allows sellers to input and edit product information. Sellers enter or edit product information, such as brand, model, category, and specifications, in the product list input module. Sellers can click the "Save" button to submit the entered product information to the system. After the seller inputs product information, the frontend sends this information to the backend, which stores it in the database. Sellers can easily add or update product information through the product list input 602, ensuring the accuracy and completeness of product data. The product list input 602 enables sellers to import product information using two methods (i.e. the spreadsheet upload and the web crawling input).

The spreadsheet upload 603 allows sellers to upload product data in bulk via an Excel or CSV file. While with the web crawling input 604, sellers can provide a URL for the system to crawl and extract product details.

The parsed product list 605 displays the uploaded or crawled product entries as a list. Each product entry is clickable, directing the seller to the part details page 606 for further refinement and validation.

The part details page 606 displays detailed information about the selected product, including brand, model, specifications, inventory, etc. After the seller clicks on a product in the product list, the system navigates to the part details page and loads the detailed information of the product. The part details page 606 is partitioned into dedicated sections to holistically present product specifications. Categorization criteria such as product attributes 607, additional resources 608, accessory listings (609), origin specifications, warehouse allocations, and comparable product benchmarks may define section parts (part 1, part 2, . . . part x et al.). For instance, the part 1 may display quantitative available 611 (e.g. 100 units available), pricing configurations 612 (e.g., 50 per unit), shipping and delivery information 613 (estimated delivery time and origin (e.g., "2 days from Austin, Texas")) along with real-time warehouse parameters and logistics status 613, all subject to real-time modifications through the merchant portal with synchronized system updates.

After completing the updates, the seller submits the data for backend validation through the schema validation status 614. The system ensures the information aligns with predefined schemas for the product category. Validated entries are marked with a checkmark for confirmation.

Streamlined product management is achieved since the interface supports bulk uploads and web crawling, reducing the time and effort required to input product data. Sellers can refine and validate individual product details, ensuring accuracy and completeness.

Further, the SKU management is achieved for enabling sellers to manage related SKUs efficiently by pre-filling attributes from similar products and prompting necessary updates.

The accessory listings simplify the procurement process for users by defining and associating compatible accessories with the product and the real-time data integration through REST APIs ensures that inventory, pricing and shipping information remains up to date.

The schema validation guarantees consistency and standardization of product data, facilitating efficient indexing and retrieval within the system. If a product does not match an existing category, sellers can navigate to the "New Category" tab (described in FIG. 7) to propose a new category.

Figure 7:
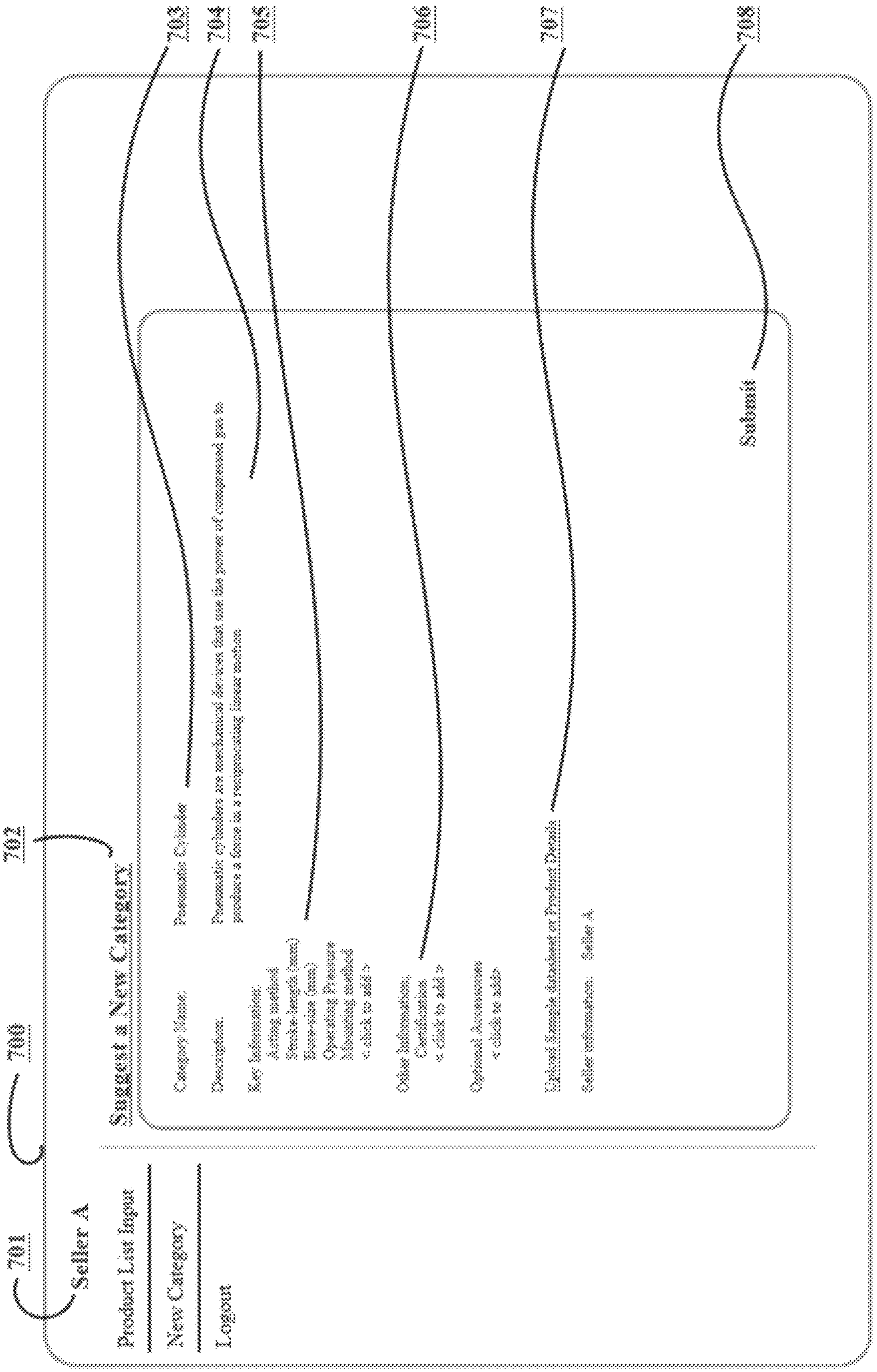
FIG. 7 is an interface for suggesting a new product category.

FIG. 7 is a seller page and new category suggestion where sellers manage their product lists and suggest new categories. This new category suggestion 700 contains multiple modules to help sellers view product lists, suggest new categories, and view detailed information about new categories and provides sellers with the ability to propose new product categories when existing ones do not sufficiently describe their products. This feature ensures the system remains adaptable and comprehensive in accommodating evolving product lines and categories.

The seller identification panel 701 displays the logged-in seller's identity, such as "Seller A." and includes navigation options such as product list input for access to manage or uploading product data, new category interface for proposing new product categories and logout allowing the seller to end the session.

In the new category suggestion 700, the seller enters details for the proposed new category in the fields of category name 703 (e.g. a clear and concise title, such as "Pneumatic Cylinder."), description 704 (e.g. a summary of the category's purpose, scope, or function, such as "Pneumatic cylinders are mechanical devices that use the power of compressed gas to produce a force in a reciprocating linear motion"), key information 705 (e.g. lists essential attributes necessary for defining the products in this category, such as: Acting Method, Stroke Length (mm), Bore Size (mm), Operating Pressure, Mounting Method), Other Information 706 (e.g. Optional fields to include additional details, such as: certifications (e.g., ISO standards compliance) and accessory Compatibility (e.g., compatible mounting brackets or sensors)) and upload sample datasheet or product details 707 (e.g., sellers can attach supporting documents, such as datasheets or product descriptions). These uploads help validate the proposed category and provide real-world examples for the application support team in the backend.

The submit button 708 allows for the seller completing the form and submitting the proposed category. The system forwards the data and any uploaded files to the application support team for review.

The system workflow for new category suggestions 700 begins with the seller submitting the necessary details through a form 702 and upload sample datasheet or product details 707 to enhance the accuracy and completeness of the proposed category, followed by a review by the application support team in the back end, who analyze the proposed category details and supporting documents to verify the accuracy and comprehensiveness of the suggested attributes, and culminates in the integration of the approved new category into the system's database, where the data is formatted into a standard JSON schema (as will be depicted in FIG. 8) to ensure seamless integration and compatibility with existing product data structures.

The new category suggestions 700 offers significant benefits, including adaptability by enabling sellers to contribute to the system's evolving database, ensuring comprehensive coverage of all product lines and categories, enhanced validation through sample uploads that provide real-world references, improving database accuracy and reducing ambiguity in category definitions, consistency across categories by standardizing submissions into a predefined schema, ensuring compatibility with the system's indexing and retrieval processes and ease of use. As the interface is designed to guide sellers through the process, facilitating comprehensive submissions with minimal complexity.

Figure 8:
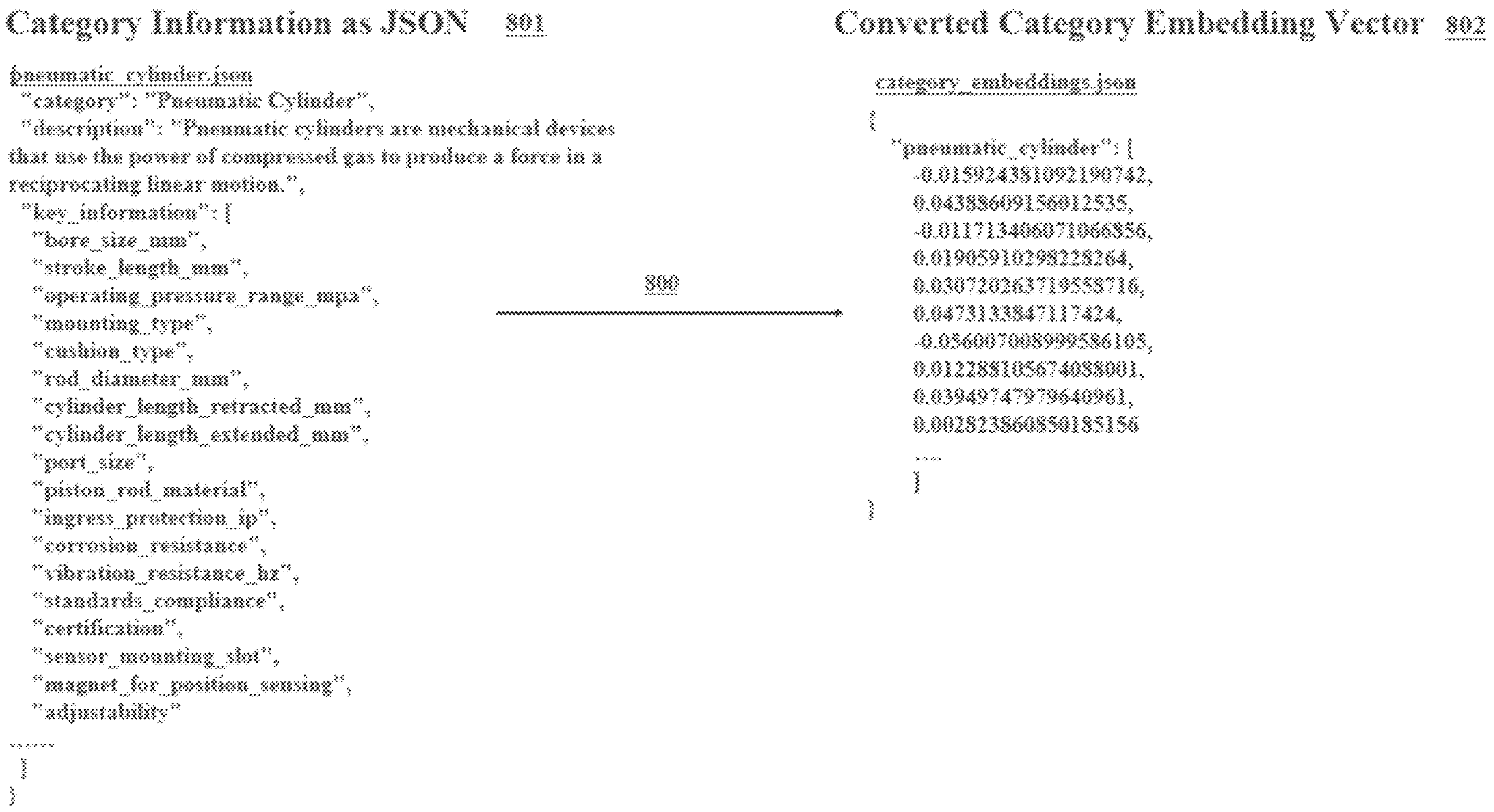
FIG. 8 is a configuration file for category information, including vector embeddings.

FIG. 8 illustrates the category information and conversion process 800, which details the structure of category data stored as a JSON schema 801 and its subsequent conversion into vector embeddings 802 for use in efficient similarity-based searches. This page contains two modules, which are used to display detailed category information (in JSON format) and the embedding vector representation of the category.

The category information as JSON 801 displays detailed information about the category, including the category name, description, key information, etc in JSON format, which is typically used for data storage and transmission. The structured data in JSON format can be easily parsed and processed by the system.

The JSON schema represents the configuration file for a specific category, such as "Pneumatic Cylinder." Key components of the JSON structure include the category name, which is a concise title (e.g., "Pneumatic Cylinder"), and a detailed description (e.g., "Pneumatic cylinders are mechanical devices that use the power of compressed gas to produce a force in a reciprocating linear motion"). Additionally, the schema lists essential attributes defining the category, such as bore size (mm), stroke length (mm), operating pressure range (MPa), cushion type, rod diameter (mm), standards compliance, certification, and sensor mounting slot. This list is extensible, allowing the system to accommodate additional attributes for other product types or new categories.

The converted category embedding vector 802 displays the embedding vector representation of the category, which is typically used for machine learning and similarity calculations. The structured category data from the JSON is transformed into an embedding vector format. Example attributes include numeric representations of the category and its parameters (e.g., −0.0159, 0.0438, 0.0122), which are optimized for similarity-based retrieval in machine learning models. These embeddings are stored in a Vector Database, enabling fast and accurate search results.

This module displays the embedding vector representation of the category, which is obtained by converting category information into a numerical vector. Embedding vectors can be used to calculate the similarity between categories, helping the system recommend related categories or products.

The system uses embedding models (e.g., Word2Vec, BERT, etc.) to convert category information (in JSON format) into embedding vectors. Embedding vectors are usually high-dimensional numerical vectors that represent the semantic information of the category.

The converted category embedding vector 802 is closely related to the category information as JSON 801. Embedding vectors are generated based on the JSON format of category information.

The converting process begins with the creation of a category schema, where the Application Support Team validates the suggested category, and the system generates a structured JSON configuration file to ensure consistency and extensibility, allowing seamless integration of new categories. Next, the category schema is converted into a vector embedding using machine learning algorithms, capturing the semantic and structural characteristics of the category for efficient retrieval. During search and matching, the user's query is first converted into a corresponding embedding vector, and a similarity measure (e.g., cosine similarity) is applied to compare the query vector against the category embeddings stored in the vector database. Matching thresholds ensure accurate results: if there is high similarity, a category is directly retrieved; if there is moderate similarity, additional clarification is requested from the user to refine the search. Once a match is identified, the category configuration is retrieved, enabling the system to return relevant attributes and refine the search.

The approach offers several advantages, including high accuracy achieved through validated category schemas and embedding-based similarity measures, which enable precise category identification and minimize errors. It eliminates hallucinations by retrieving only validated data from the vector database, unlike third-party Large Language Models (LLMs) that may produce inaccurate or biased results. The system is highly scalable, as its vector-based architecture supports large and complex datasets, making it adaptable for diverse product categories and attributes. Additionally, the schema is extensible, allowing easy accommodation of new categories and attributes to ensure the system evolves with market needs. Finally, the attributes retrieved from the configuration file provide tailored and contextually relevant responses to user queries, enhancing the overall user experience.

Those skilled in the art should understand that the specific implementations described above merely illustrate the use of JSON language, and any other similar languages, without departing from the spirit of the disclosure, should also fall within the scope of the present invention.

FIG. 9 illustrates the category information schema 900, which provides a standardized structure for defining and configuring products or parts within specific categories, such as pneumatic cylinders. This schema ensures uniformity, accuracy, and data integrity across all products within a category.

The schema framework (901) is based on JSON Schema standards ("$schema": "http://json-schema.org/draft-07/schema #"), ensuring compatibility with modern data validation techniques. It includes two primary sections: general Information and physical specifications. The general information section specifies high-level attributes such as manufacturer, model number, product series, and cylinder type, with these fields marked as required for successful schema validation. The physical specifications section details essential attributes such as bore size (mm), stroke length (mm), rod diameter (mm), cylinder length (retracted and extended), mounting type, and port size, with critical fields like bore size, stroke length, and mounting type marked as required for defining pneumatic cylinders.

The validation process 902 ensures that the data submitted for each product adheres to the predefined schema structure. This includes schema validation, which verifies the presence of required fields and checks for appropriate data types (e.g., strings, numbers); error handling, which flags missing or incorrectly formatted attributes and prompts the user to provide corrections; and data consistency, which guarantees a uniform structure for all products within a category, enabling seamless indexing and retrieval.

The schema validation process begins with adding new products (submitted from parts detail page in the FIG. 6), where the system validates the information submitted by a seller or user against the predefined schema, ensuring attributes such as bore size, stroke length, and mounting type comply with the required standards. If discrepancies are detected, such as missing attributes or incorrect data types, the system provides detailed feedback to the user, allowing them to correct errors before submission. Once the product information is successfully validated, it is indexed in the database, ensuring compatibility with the system's advanced search and retrieval functionalities. The standardized schema structures further enable efficient compatibility checks and data comparisons across similar products, enhancing overall system performance and accuracy. The schema validation 902 displays the schema validation process for category information, ensuring that the structure of the category information conforms to the predefined schema. When the system receives or processes category information, it performs schema validation to ensure that the structure conforms to the predefined JSON schema. If the category information conforms to the schema, the system continues processing; if not, the system returns an error message. The schema validation 902 ensures that the structure of the category information meets system requirements, avoiding issues caused by data format errors.

Figure 10:
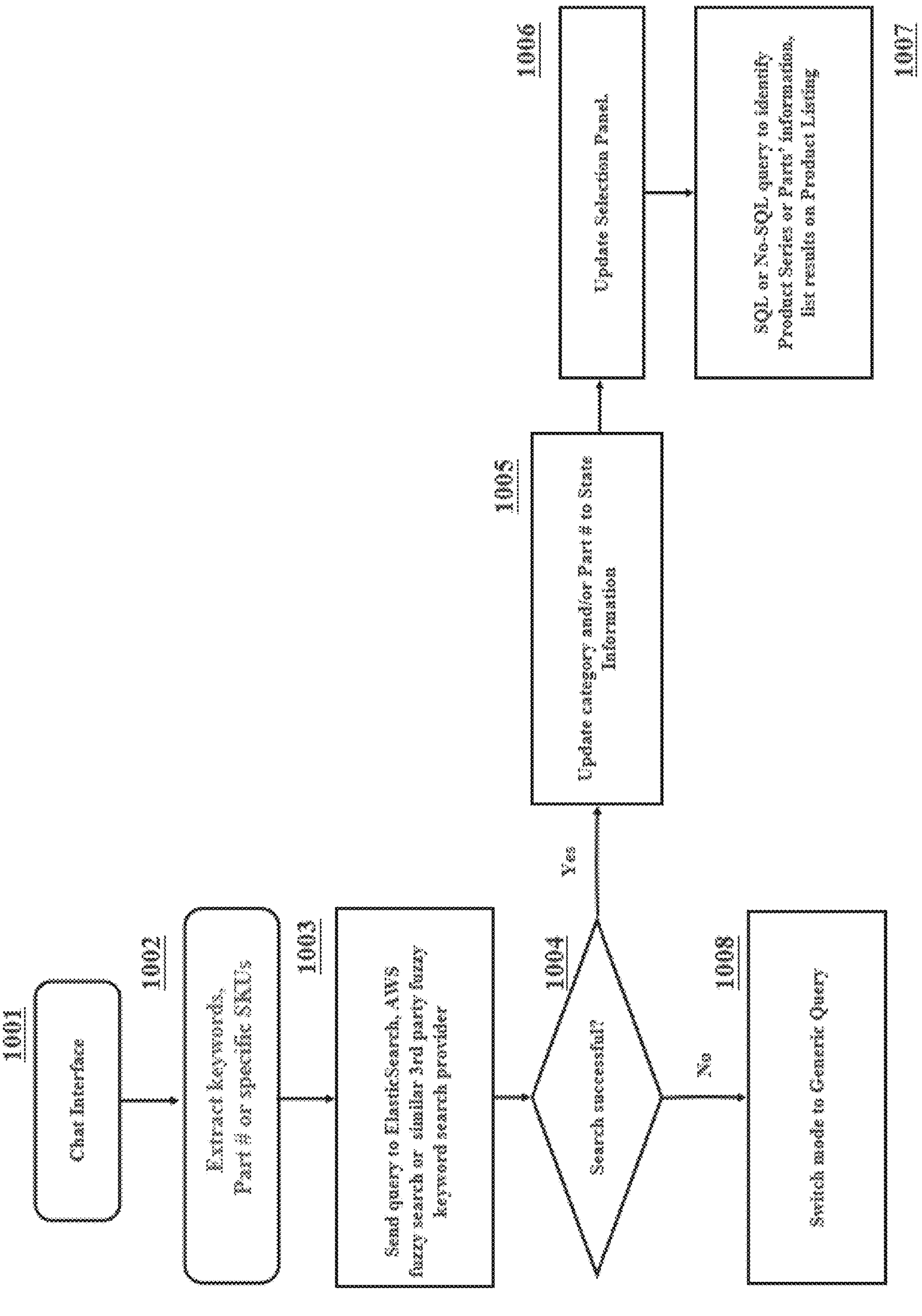
FIG. 10 is a query processing workflow from the main page.

FIG. 10 illustrates the search process. The process begins with step 1001, users initial the chat interface. In step 1001, users input queries in various formats, such as part numbers (e.g., "DSNU-16-100-PPS-A"), keywords or attributes (e.g., "stroke length 100 mm"), or descriptive use cases (e.g., "mechanism for 100 mm motion with air pressure of 6 bar").

However, in other embodiments, alternately, this can be embedded into a platform's search and shall not be limited herein.

The system then performs keyword extraction in step 1002, identifying relevant keywords, part numbers, or specific SKUs from the query to ensure compatibility with third-party search systems.

Next, the extracted information is sent to a third-party fuzzy search provider in the step 1003, such as ElasticSearch or AWS Fuzzy Search, which leverages robust keyword matching and fuzzy logic to retrieve results even if the query contains errors or incomplete details.

After receiving the results, the system conducts search validation in the step 1004 to determine whether the search was successful. If successful, the system updates state information in step 1005 with the retrieved data, including identified product categories or parts, relevant attributes and parameters, and any missing key information requiring user input. This triggers dynamic updates to the selection panel in step 1006, which reflects categories, attributes, or other parameters for refinement, and the product listing (1007), which displays matching products, series, or part numbers. Additionally, SQL or No-SQL queries are executed to retrieve detailed product information for listing.

If the search is unsuccessful, the system redirects to the generic query process in step 1008 for further interpretation and refinement such a fallback process for more advanced query interpretation, as will be detailed in later figures. This fallback mechanism ensures that even ambiguous or incomplete queries can be processed effectively.

Users interact with the system using natural language, and the system can understand the user's intent and prepare for the search. The system uses NLP techniques or regular expressions to extract keywords, part numbers, or SKUs from the user's input.

Figure 11:
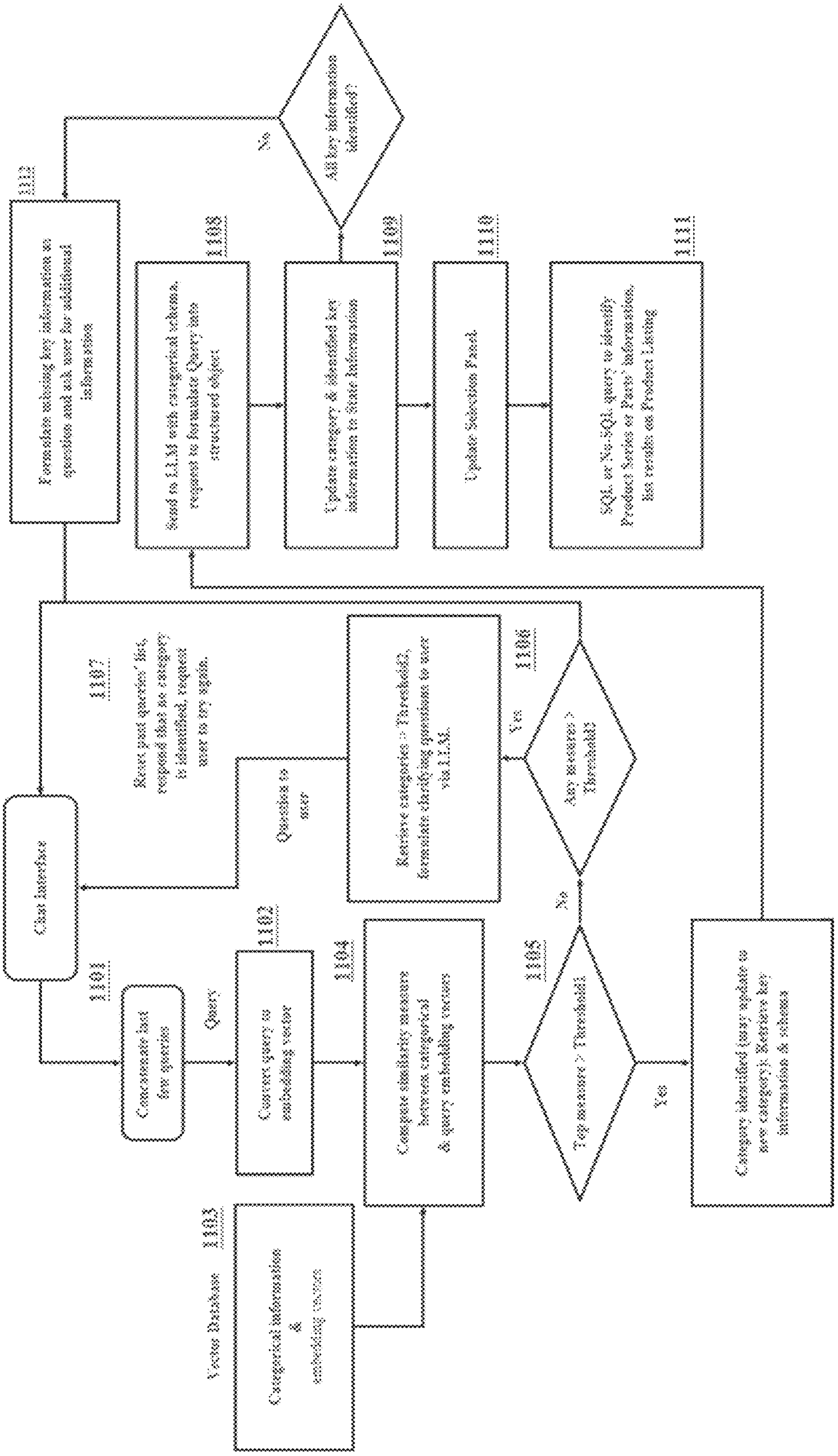
FIG. 11 is a generic query search process using vector embeddings.

FIG. 11 depicts the generic query search process, wherein an algorithm is provided to address challenges in traditional search systems and prior art. This process emphasizes accuracy, contextual refinement, and user guidance by leveraging validated data and advanced query refinement methodologies.

The generic query search process begins at the chat interface. In step 1101, the primary input mechanism where user queries are received, which supports the concatenation of the last few queries to provide contextual input for the current query. This concatenated query is then converted into an embedding vector during the vector embedding conversion in step 1102, representing the query in a mathematical format compatible with the database and facilitating similarity matching. In step 1103, the categorical information and vector database stores embedding vectors for predefined product categories, serving as benchmarks for similarity computations. The similarity measure calculation is conducted in step 1104 to match the query embedding vector with category embedding vectors using cosine similarity or alternative measures, depending on the application requirements, ensuring accurate and context-aware search results.

Vector representations of user queries are generated using transformer-based embedding models. Similarity metrics are then computed between query vectors and precomputed category vectors stored in a vector database. The query matches are classified into three different categories (i.e. the definitive matches exceeding a first similarity threshold, ambiguous matches between the first similarity threshold and a second similarity threshold requiring disambiguation prompts, and non-matches below the second similarity threshold triggering query reset protocols). The similarity metrics include cosine similarity measurements between query embedding vectors generated in real-time, and category reference vectors stored in the vector database. In one specific implementation, the first similarity threshold is 0.85 and the second similarity threshold is 0.65. However, the thresholds are empirically defined and can be different numbers depending on applications.

The process of threshold-based category identification begins by evaluating the similarity scores of categories against predefined thresholds in step 1105. If the category with the highest similarity score exceeds threshold 1, it is considered a match, and the system retrieves the corresponding category information, including schema and key attributes. If no category exceeds threshold1 but scores fall between threshold1 and threshold2 in step 1106, the system formulates clarifying questions using a Large Language Model (LLM) and appends the user's response to the query for iterative refinement. If no scores exceed threshold2 in step 1107, the query is reset, and the system informs the user of the failure, prompting them to try again.

Once a category is successfully identified, the concatenated query is sent to an LLM in step 1108 to organize it into a schema-aligned structured object. During this key information structuring step, attributes and parameters are extracted and updated to state information in step 1109, ensuring the system maintains accurate and up-to-date search context.

Following this, the system performs dynamic interface updates. First, the selection panel update in step 1110 reflects identified attributes, missing information, and refinement options, providing users with a clear and interactive interface. Next, the product listing update in step 1111 uses SQL or NoSQL queries to retrieve matching products or series from the component database based on the refined parameters, ensuring relevant results are displayed.

Finally, the process incorporates iterative user guidance. Missing key information is presented as follow-up questions to the user in step 1112, enabling iterative and guided search refinement. Users can interact through the chat interface or directly refine options using the selection panel, ensuring a seamless and user-friendly search experience.

The process ensures the elimination of hallucinations by relying on retrieval-based techniques with validated data from the vector database, guaranteeing that all responses are fact-based and avoiding risks associated with generative hallucinations in LLMs.

It incorporates iterative refinement and guidance, combining user interactions with algorithmic precision to iteratively refine queries. This approach bridges the knowledge gap for novice users while providing advanced tools for experienced engineers.

The system supports dynamic interaction and scalability, offering real-time updates across the selection panel and product listing to enhance usability. Its modular architecture ensures scalability, enabling it to handle large datasets and diverse categories efficiently.

Threshold-based accuracy is achieved through dual thresholds (threshold1 and threshold2), which ensure balanced handling of ambiguous queries. This prevents false positives and minimizes irrelevant results, improving search precision.

Further, robust error handling and robustness are maintained through query reset mechanisms. These mechanisms flag ineffective queries and guide users to restart, ensuring system reliability and a smooth user experience.

Figure 12:
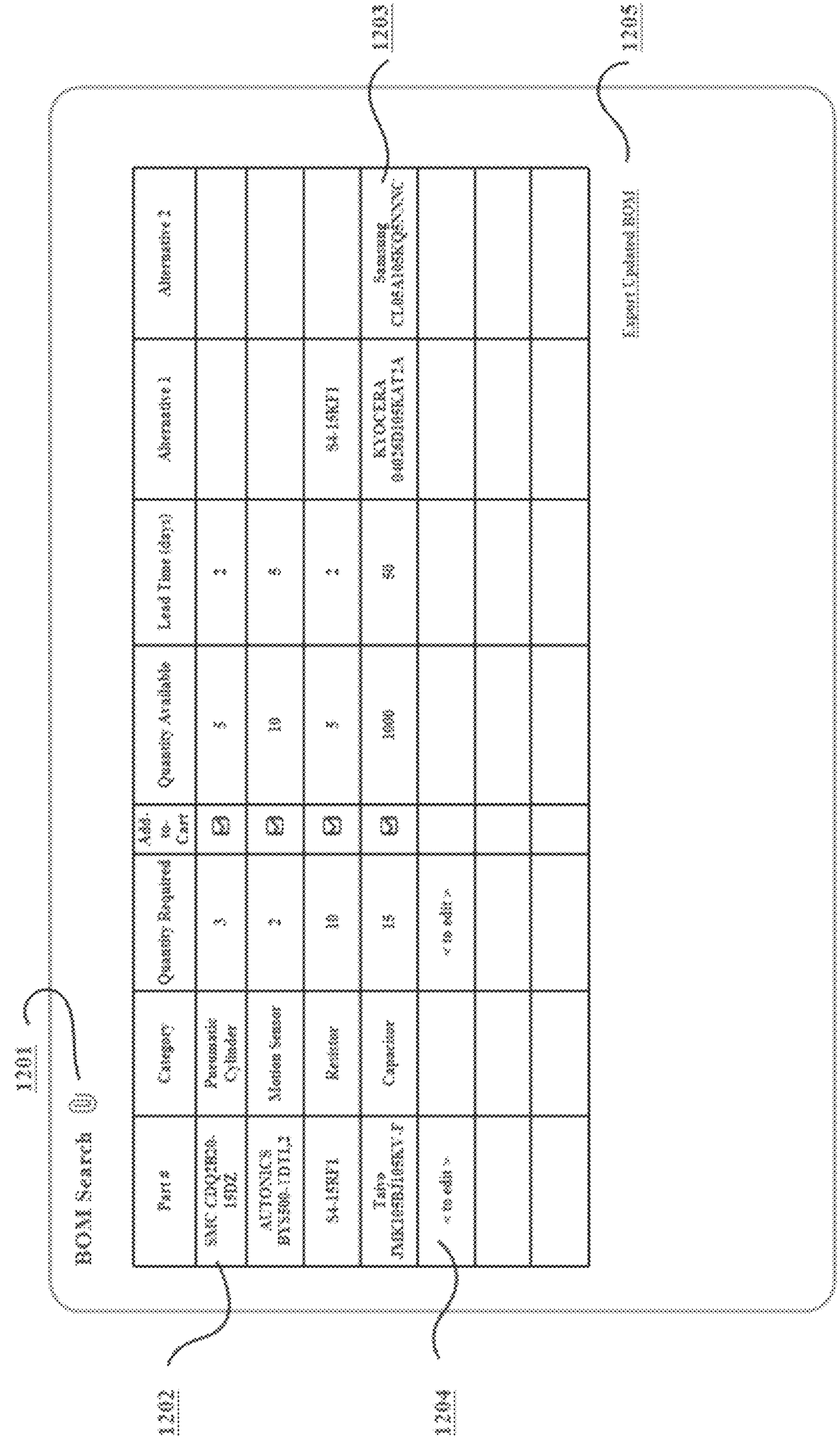
FIG. 12 is a BOM processing and alternative part recommendation interface.
Figure 13:
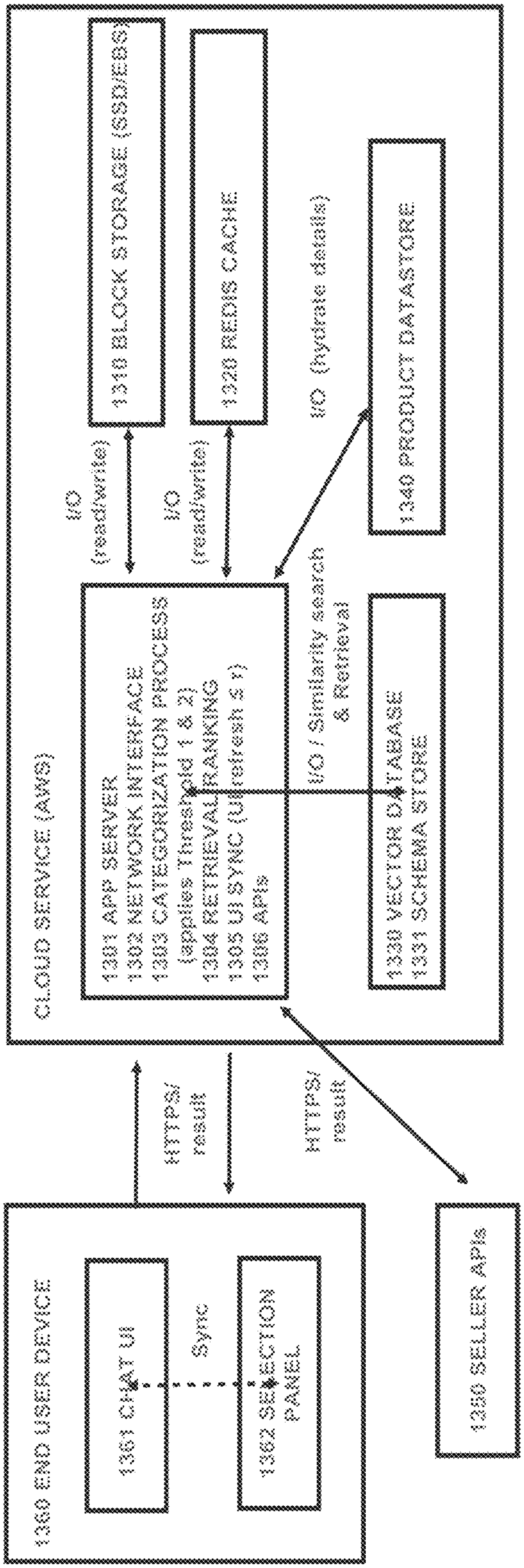
FIG. 13 is an example of an architecture diagram of the intelligent multi-modal component search and procurement system.

FIG. 12 illustrates the result page for BOM Search, showcasing the system's ability to efficiently process and manage Bill of Materials (BOM) files, a critical functionality for procurement personnel handling batch processing and complex BOM requirements. The BOM search panel 1201 serves as the central interface, allowing users to upload and manage BOM files through an upload affordance (icon) that supports spreadsheets in structured or unstructured formats containing basic data like part numbers and quantities. Once uploaded, the parsed BOM table 1202 displays structured data extracted from the file, with columns including part #(listing identified part numbers), category (e.g., pneumatic cylinder, motion sensor), quantity required (requested quantities), add-to-cart button (for direct procurement), quantity available (current stock levels), lead time (estimated delivery in days), and alternative parts (recommended substitutes for shortages or long lead times).

The alternative recommendations 1203 is populated based on attribute matching and system recommendations, enabling users to evaluate alternatives by examining their attributes, availability, and lead times. For further customization, interactive editing 1204 allows users to edit part details or manually add specifications, with dynamic updates applied in real-time. Finally, the export updated BOM button 1205 provides functionality to save and export the finalized or revised BOM for archival or sharing, ensuring a seamless and user-friendly experience for managing complex procurement tasks.

The system offers flexibility in BOM formats, avoiding strict formatting requirements to ensure compatibility with diverse BOM templates used across industries. It integrates real-time data integration, dynamically updating stock levels, pricing, and lead times to minimize manual effort and reduce errors. Additionally, the system provides actionable insights, such as alternative parts recommendations, enabling users to mitigate supply chain disruptions and optimize procurement decisions. For enhanced usability, it supports streamlined editing and exporting, allowing on-the-fly adjustments to BOM entries and facilitating easy export of updated files. Finally, the system features a user-friendly interface that combines simplicity with robust functionality, catering to both novice users and experienced procurement professionals, ensuring an efficient and intuitive experience.

The intelligent multi-modal component search and procurement System provides a comprehensive solution for industrial component procurement. By integrating multiple input modalities, advanced filtering, and NLP-based interactions, the system significantly improves the efficiency and accuracy of component searches. The system's modular design ensures flexibility and scalability, making it suitable for a wide range of industrial applications.

What is claimed is:

1. A system for component search and procurement comprising:

an application server comprising one or more processors and a non-transitory memory;

a multi-modal query processor, executing on the one or more processors of the application server and configured to receive and normalize input data selected from the group consisting of part numbers, keywords, partial information descriptors, natural language descriptions, and Bill of Materials (BOM) files;

a classifier, executing on the one or more processors of the application server and in communication with a vector database, configured to implement a dual-threshold semantic matching pipeline by:

converting a user query into a query embedding vector using a transformer-based embedding model;

querying the vector database to compute similarity metrics between the query embedding vector and a plurality of precomputed category embedding vectors stored therein, wherein each category embedding vector is derived from a structured JSON schema defining a canonical product category;

based on the similarity metrics relative to a first similarity threshold and a second similarity threshold lower than the first similarity threshold, classifying a query match and triggering a corresponding action while suppressing the others from the group consisting of:

a direct retrieval of a matched canonical product category when a similarity metric exceeds the first threshold;

generation of a disambiguation prompt via a conversational agent when the similarity metric is between the first similarity threshold and the second similarity threshold; and triggering a query reset protocol when the similarity metric is below the second threshold;

a dynamic interface subsystem, comprising:

the conversational agent configured to iteratively refine search parameters through context-aware dialogue sequences based on the output from the classifier, and a synchronized selection panel configured to display real-time updates of product taxonomies corresponding to query refinements; and a UI synchronization module, executing on the one or more processors of the application server, configured to maintain bidirectional state synchronization between the conversational agent and the synchronized selection panel, and to update their respective displays within a configurable latency bound (t) in response to changes in matched categories or attributes;

a recommendation processor executing on the one or more processors of the application server, configured to employ weighted ranking algorithms that prioritize results based on a combination of user-specific parameters including historical procurement patterns, geographic constraints, and organizational purchasing policies; and a product database architecture, comprising:

a product datastore storing structured component metadata;

an inventory monitoring service configured to execute availability-aware inventory queries through API connections to supplier systems only during execution of direct retrieval of the matched canonical product category when the similarity metric exceeds the first threshold;

wherein the vector database and the product datastore are physically distinct from the application server and accessed via network interfaces.

2. The system of claim 1, further comprising a BOM processing module implementing a machine learning model configured to:

parse unstructured material lists, generate standardized component tables with substitution recommendations; and export procurement-ready documentation in configurable output formats.

3. The system of claim 2, wherein the BOM processing module comprises:

a format converter supporting file types selected from the group consisting of CSV, XML, PDF, and proprietary ERP formats;

an LLM-based parser extracting technical specifications from unstructured documents; and a compatibility analyzer generating substitution recommendations based on dimensional tolerances and performance characteristics.

4. The system of claim 3, wherein the compatibility analyzer is configured to implement:

parametric matching algorithms comparing mechanical and electrical specifications;

certification validation checks against industry standards databases; and lead time optimization routines prioritizing available substitutes with equivalent functionality.

5. The system of claim 1, wherein the multi-modal query processor comprises natural language processing (NLP) components configured to detect and resolve query ambiguities through:

semantic similarity analysis against product taxonomy graphs, and contextual clarification requests generated via the conversational agent.

6. The system of claim 1, wherein the similarity metrics comprise cosine similarity measurements between:

query embedding vectors generated in real-time, and category reference vectors stored in the vector database;

wherein the first similarity threshold is 0.85 and the second similarity threshold is 0.65.

7. The system of claim 1, wherein the recommendation processor is configured to dynamically adjust ranking weights based on:

real-time inventory updates received from connected supplier systems;

historical fulfillment success rates of identified vendors; and organization-specific procurement rules encoded in policy databases.

8. The system of claim 1, wherein the dynamic interface subsystem is configured to maintain state synchronization between:

the conversational agent's natural language interaction history;

the selection panel's displayed product taxonomies; and inventory database queries executed through the product database architecture.

9. The system of claim 1, further comprising an administrative portal configured to:

receive new product category definitions from verified suppliers;

validate schema compliance through automated test case verification; and update the vector database with retrained embedding models incorporating new category data.

* * * * *